United States Patent
Persson et al.

(10) Patent No.: US 9,444,347 B2
(45) Date of Patent: Sep. 13, 2016

(54) SWITCHED MODE POWER SUPPLY WITH A SIMPLIFIED START-UP SUPPLY

(75) Inventors: Oscar Persson, Kalmar (SE); Mikael Appelberg, Morbylanga (SE); Marko Leskovec, Nybro (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 402 days.

(21) Appl. No.: 14/112,032

(22) PCT Filed: Apr. 15, 2011

(86) PCT No.: PCT/EP2011/056012
§ 371 (c)(1),
(2), (4) Date: Jun. 18, 2014

(87) PCT Pub. No.: WO2012/139654
PCT Pub. Date: Oct. 18, 2012

(65) Prior Publication Data
US 2014/0293662 A1    Oct. 2, 2014

(51) Int. Cl.
*H02M 3/335*    (2006.01)
*H02M 1/36*    (2007.01)

(52) U.S. Cl.
CPC .............. *H02M 3/335* (2013.01); *H02M 1/36* (2013.01); *H02M 3/33507* (2013.01); *H02M 3/33523* (2013.01)

(58) Field of Classification Search
CPC .. H02M 3/335; H02M 1/36; H02M 3/33507; H02M 3/33523; H02M 2001/0032; H02M 2001/0035; H02M 2001/0038; H02M 3/00
USPC ...................... 363/25, 49; 323/901, 238, 908
See application file for complete search history.

(56) References Cited

U.S. PATENT DOCUMENTS

| | | | | |
|---|---|---|---|---|
| 5,715,155 A | * | 2/1998 | Shahani | H02M 3/337 363/132 |
| 5,973,942 A | * | 10/1999 | Nelson | H02H 9/001 323/901 |

(Continued)

FOREIGN PATENT DOCUMENTS

| | | |
|---|---|---|
| CN | 1370345 A | 9/2002 |
| DE | 4204912 | 8/1993 |
| EP | 2299572 | 3/2011 |

OTHER PUBLICATIONS

First Office Action, CN Application No. 201180070138.3, dated Aug. 27, 2015, 6 pages.

(Continued)

*Primary Examiner* — Jessica Han
*Assistant Examiner* — Bart Iliya
(74) *Attorney, Agent, or Firm* — NDWE LLP (57) ABSTRACT

A switched mode power supply (SMPS) is disclosed in which a simple primary side controller is used to send a single pulse of energy to the secondary side to switch on an output voltage controller. The pulse is sent across the main power train and a filtering arrangement is provided on the secondary side to minimize the energy at the output of the SMPS while maximizing the energy supplied to the output voltage controller. Advantageously, the SMPS is configured such that the maximum amount of energy transferred from the primary side to the secondary side during a start-up operation is inherently limited. Protection against short circuit conditions and malfunctions is therefore provided without requiring complicated circuitry.

18 Claims, 4 Drawing Sheets

(56) References Cited

U.S. PATENT DOCUMENTS

| | | | |
|---|---|---|---|
| 6,381,150 B2* | 4/2002 | Telefus | H02M 3/3376 363/15 |
| 6,456,511 B1 | 9/2002 | Wong | |
| 6,487,092 B2* | 11/2002 | Nishikawa | H02M 3/337 363/132 |
| 6,510,066 B2* | 1/2003 | Giannopoulos | H02M 3/33523 363/21.01 |
| 6,687,137 B1 | 2/2004 | Yasumura | |
| 2003/0133315 A1* | 7/2003 | Lucas | H02M 1/36 363/49 |
| 2004/0095786 A1* | 5/2004 | Huang | H02M 1/36 363/49 |
| 2008/0043494 A1* | 2/2008 | Jiao | H02M 3/337 363/16 |
| 2008/0259649 A1 | 10/2008 | Marchand et al. | |
| 2009/0103334 A1 | 4/2009 | Tamaki | |
| 2009/0290389 A1* | 11/2009 | Ueno | H02M 3/337 363/21.02 |

OTHER PUBLICATIONS

PCT Written Opinion of the International Searching Authority for PCT Counterpart Application No. PCT/EP2011/056012, mailed Jan. 19, 2012, 6 pages.

PCT Notification of Transmittal of the International Preliminary Report on Patentability for PCT Counterpart Application No. PCT/EP2011/056012, mailed Apr. 3, 2013, 6 pages.

PCT International Search Report for PCT Counterpart Application No. PCT/EP2011/056012, mailed Jan. 19, 2012, 3 pages.

Second Office Action, CN Application No. 201180070138.3, dated Jan. 11, 2016, 7 pages.

* cited by examiner

SWITCHED MODE POWER SUPPLY WITH A SIMPLIFIED START-UP SUPPLY

CROSS-REFERENCE TO RELATED APPLICATIONS

This application is a National stage of International Application No. PCT/EP2011/056012, filed Apr. 15, 2011, which is hereby incorporated by reference.

TECHNICAL FIELD

The present invention generally relates to the field of switched mode power supplies (sometimes referred to as switch mode power supplies or switching mode power supplies) and more specifically to the provision of power to switch on an output voltage controller located on the secondary side of a transformer of the switched mode power supply.

BACKGROUND

The switched mode power supply (SMPS) is a well-known type of power converter having a diverse range of applications by virtue of its small size and weight and high efficiency. For example, SMPSs are widely used in personal computers and portable electronic devices such as cell phones. An SMPS achieves these advantages by switching a switching element such as a power MOSFET at a high frequency (usually tens to hundreds of kHz), with the frequency, or duty cycle, of the switching being adjusted to convert an input voltage to a desired output voltage.

An SMPS may take the form of a rectifier (AC/DC converter), a DC/DC converter, a frequency changer (AC/AC) or an inverter (DC/AC).

SMPSs are characterised by a transformer with a primary side and a secondary side that respectively define the input side and output side of the SMPS. The transformer provides isolation between the input and output sides and it is important that this isolation between the input and output of the SMPS is maintained.

A pulse width modulator (PWM) generates a duty cycle signal. The duty cycle signal is used to switch at least one transistor so as to apply the Input voltage, at the duty cycle, at the inputs to the primary side of the transformer.

The input voltage at the primary side causes a voltage to be induced at the secondary side of the transformer that, for SMPS designs with a DC output, is then rectified to provide the output voltage.

Voltage control is required for meeting the increasing requirements of regulation and dynamic performance (such as monotonic start-up, paralleling, pre-bias immunity, accurate load regulation and remote voltage sensing).

It is preferable to use the secondary side alone for performing the control of the output voltage as this gives the lowest distortion of the desired ramp-up curve as well as accurate start-up performance. This can be achieved by providing an output voltage controller on the secondary side, the output voltage controller typically comprising a PWM for controlling the switching of the SMPS and a voltage regulator for regulating the output voltage.

Known systems use an additional power supply to provide a power source to the secondary side output voltage controller so that the output voltage controller can start the converter. The additional power supply is usually provided by a second transformer, within the SMPS, that transfers power from the primary side across the isolation barrier. Alternatively, a separate and independent power supply unit may be provided on the secondary side.

However, the above approaches of providing an additional power supply suffer from a number of problems. In particular, they increase the cost of the SMPS, it is more difficult to achieve higher isolation voltages, and the size of the SMPS is increased.

In view of the above problems, known systems have powered a secondary side output voltage controller with power from the primary side by transferring power across the same transformer used to transfer power to the output of the SMPS. In this way, an additional transformer is not required for transferring power across the isolation barrier.

However, with systems that adopt the above approach, power supplied to switch on the voltage regulator is also supplied to the output of the SMPS. This causes problems when the SMPS is switched on since power appears at the SNIPS output before the output voltage controller is switched on and operating. This can cause obstacles such as glitches, plateaus and distortion of the desired start-up ramp figure (i.e. the excess power causes the start-up to be non-monotonic).

Secondary side voltage control has therefore only been implemented in large SMPSs in which complicated and expensive power control schemes can be provided.

SUMMARY

According to the present invention, there is provided a switched mode power supply comprising a transformer having a primary side and a secondary side. An input to the switched mode power supply is arranged on the primary side. A main output of the switched mode power supply is arranged on the secondary side. An output voltage controller is arranged on the secondary side and is operable to control the output voltage at the main output of the switched mode power supply. A power supply circuit is arranged to provide a power supply on the secondary side, wherein the power supply circuit is operable to receive power from the primary side via the transformer and to output power to the main output and also to the output voltage controller. An energy storage unit is arranged on the primary side and is operable to receive and store a finite amount of energy from the input to the switched mode power supply and to output a finite energy pulse to the transformer. A control module is arranged on the primary side and operable to switch on the output voltage controller by releasing a finite energy pulse from the energy storage unit.

The present invention also provides a method of operating a switched mode power supply having a transformer with a primary side and a secondary side. An input to the switched mode power supply is arranged on the primary side. An energy storage unit is arranged on the primary side. A main output of the switched mode power supply is arranged on the secondary side. An output voltage controller is arranged on the secondary side to receive power from the primary side and to control the output voltage at the main output of the switched mode power supply. The method is performed to switch on the output voltage controller and comprises: receiving energy at the input of the switched mode power supply; storing a finite amount of the received energy in the energy storage unit; releasing stored energy from the energy storage unit as a finite energy pulse; and transmitting the finite energy pulse from the primary side to the secondary side of the transformer so that energy is received by the output voltage controller.

In accordance with these features embodiments of the invention address the above described problems by providing a simple control module on the primary side of an SMPS.

The control module is arranged to control the switching such that the converter is jumpstarted with a single pulse of energy. The pulse of energy, that is sent from the primary side to the secondary side during a start-up operation, is sufficient to cause a secondary side output voltage controller to switch on and operate.

Advantageously, the SMPS is configured such that the maximum amount of power that can be transferred from the primary side to the secondary side during a start-up operation is inherently limited. Protection against short circuit conditions and malfunctions is therefore provided without requiring a complicated circuitry.

DESCRIPTION OF EMBODIMENTS

As will be explained below, an embodiment of the invention provides an SMPS in which the same transformer is used for providing power from the primary side to both the main output of the SMPS and an output voltage controller arranged on the secondary side.

A filtering arrangement ensures that sufficient energy is transferred to switch on the output voltage controller before a significant amount of power has been transferred to the main output of the SMPS.

Before a start-up operation occurs, energy is stored in an energy storage unit provided on the primary side.

During a start-up operation, energy is released from the energy storage unit and transferred from the primary side to the secondary side.

The amount of energy transferred to the secondary side cannot be more than the total amount of energy stored in energy storage unit. Limiting the maximum amount of energy transferred to the secondary side to the capacity of the energy storage unit or less provides inherent protection against the effect of a short circuit or malfunction.

In response to receiving energy from the primary side, the output voltage controller is arranged to switch on and take over control of the switching of the SMPS.

A special rectifier filter is provided on the secondary side to minimise the power sent to the output terminals of the SMPS while maximising the power provided to the output voltage controller.

A control module is provided which is arranged to continue the control of the start-up operation until the output voltage controller is switched on and the main power train of the SMPS is operating.

An embodiment of the invention, implemented in a DC/DC converter by way of example, is described in more detail below with reference to FIG. 1.

Figure 1:
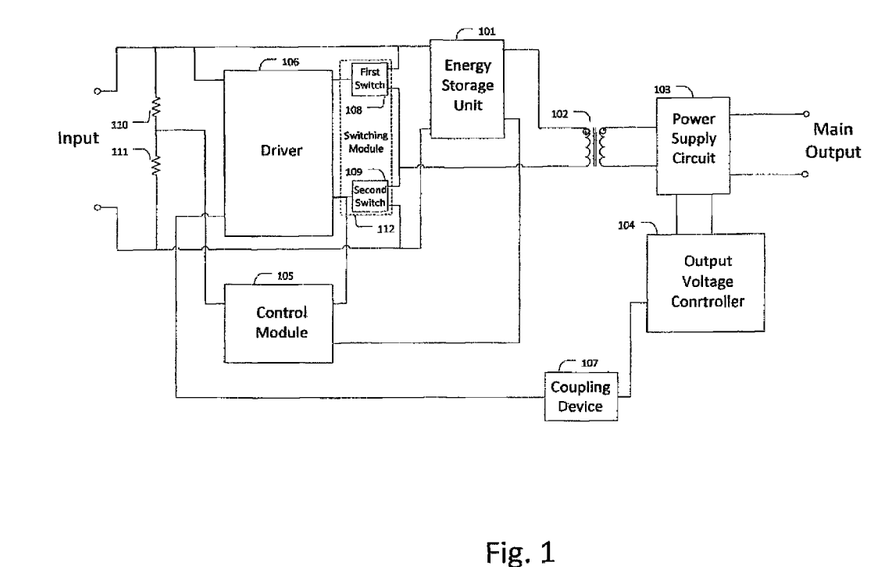
FIG. 1 is a block diagram of an SMPS according to a first embodiment of the invention.

Referring to FIG. 1, the transformer 102 of the SMPS has a primary side and a secondary side.

The primary side comprises the input to the SMPS, input resistors 110 and 111, a switching module 112 comprising first and second switches 108 and 109, a driver 105 for the switches, an energy storage unit 101 and control module 105.

The secondary side of the transformer 102 comprises the main output of the SMPS, a power supply circuit 103 and an output voltage controller 104.

A coupling device 107 is arranged to provide a control signal from the secondary side to the primary side.

The first and second switches 108 and 109 are provided in series with each other across the terminals of the input to the SMPS. A midpoint of the series connection of switches 108 and 109 is connected to a terminal of the primary side coil of the transformer 102. The switching of switches 108 and 109 is controlled by the control module 105 and the driver 106.

The output voltage controller 104 comprises a pulse width modulator and a voltage regulator.

When the output voltage controller 104 is switched on and operating, it controls the voltage conversion performed by the SMPS. More particularly, the output voltage controller 104 monitors the output voltage of the SMPS and adjusts the duty cycle that first and second switches are switched at to maintain a stable output voltage regardless of load and input voltage.

When the SMPS has been in a state in which it was not operating, and then a voltage appears at the input of the SMPS, energy input into the SMPS is stored in the energy storage unit 101.

The control module 105 monitors the voltage at a position within the voltage divider provided by the input resistors 110 and 111 to determine the input voltage.

The control module 105 also monitors a signal from the energy storage unit that is indicative of the amount of stored energy.

When the control module 105 determines that the amount of stored energy in the energy storage unit is sufficient for a start-up attempt to be made, the control module 105 switches on the second switch 109 to start the release of energy from the energy storage unit 101.

The control module 105 monitors the amount of energy stored in the energy storage unit and calculates the amount of released energy based on the current and previous amounts of stored energy.

When a predetermined amount of energy has been released, or after the transistor 109 has been switched on for a predetermined maximum duration, the switch 109 is switched off to stop the release of energy from the energy storage unit 101.

The released energy, in the form, of a single voltage pulse, then flows from the energy storage unit 101 and through the Primary coil of the transformer 102. Energy is therefore transferred to the secondary side of the transformer 102 and to the power supply circuit 103. The power supply circuit 103 transfers received energy both to the main output of the SMPS and to the output voltage controller 104.

A filtering arrangement within the power supply circuit 103, described in more detail later, ensures that energy is transferred to the output voltage controller 104 faster than energy is transferred to the main output.

When the output voltage controller 104 receives sufficient energy from the power supply circuit 103 to switch on, the output voltage controller 104 will start the control processes of the voltage at the main output of the SMPS and send a control signal for controlling the switching of the switches 108 and 109 to the primary side via the coupling device 107 and the driver 106.

When the control module 105 detects signals derived from the output voltage controller 104, the control module 105 determines that the output voltage controller is operating and that no further start-up attempt is necessary.

Accordingly, in a start-up operation, only one pulse of energy is transferred from the primary side to the secondary side. The energy of the pulse is energy that has been released from the energy storage unit, and is of a finite amount.

Not all of the stored energy in the energy storage unit needs to be released and transferred to the secondary side. The control module could be designed to operate by releasing, for example, only 10% of the energy stored in the energy storage unit. However, the maximum amount of energy that can be transferred from the primary side to the secondary side is limited to the total energy stored in the energy storage unit 101.

Advantageously, the worst case scenario of the maximum amount of energy transferred to the secondary side during a short circuit condition or malfunction is known (this maximum amount being the total energy stored in the energy storage unit).

As described above, the control module sends a single pulse from the primary to secondary sides to start the output voltage controller 104. In the case of a failure of the start of the output voltage controller 104, or a slow start situation, the control module repeats the process of sending a single pulse and waiting to see if the voltage controller 104 starts. Each single pulse sent comprises substantially the same amount of energy. The amount of energy in each pulse is set so as to be sufficient to turn on the output voltage controller under typical operating conditions.

For each single pulse that is sent from the primary to secondary sides, all of the conditions for sending a pulse on the primary side need to be reset. More particularly, the energy storage unit 101 needs to be recharged with energy from the input. Since recharging the energy storage unit would typically take a relatively long time, the repetition frequency of any further single pulses that are sent would be low.

The single pulse of energy that is sent from the primary to secondary sides of the transformer 102 uses the transformer primary core in one direction only. This results in an inexpensive and simple design of SMPS since no magnetic reset of the coil of the transformer 102 is required. Were bi-directional switching used, more complicated and expensive circuitry, similar to a primary side PWM, would be required.

When using the primary side coil of the transformer 102 in one direction only, after a period of time the transformer core may reach maximum magnetisation, saturate and create a short circuit situation.

The control module 105 comprises devices for sensing the amount of energy transferred to the secondary side. The control module 105 is also able to detect if a short circuit situation has occurred and, with the maximum amount of transferred energy limited, inherent protection is provided in such eventualities.

As described above, the switch 109 is switched to release energy from the energy storage unit 101. This implementation is both easier and cheaper than switching switch 108 because switch 109 has a ground reference.

However, it would alternatively have been possible for the SMPS to be configured such that the control module 105 switches on the switch 108 to release energy from the energy storage unit 101 and switch off the switch 108 to stop the release of energy from the energy storage unit 101.

A more detailed circuit diagram of the above embodiment shown in FIG. 2 and described below.

Figure 2:
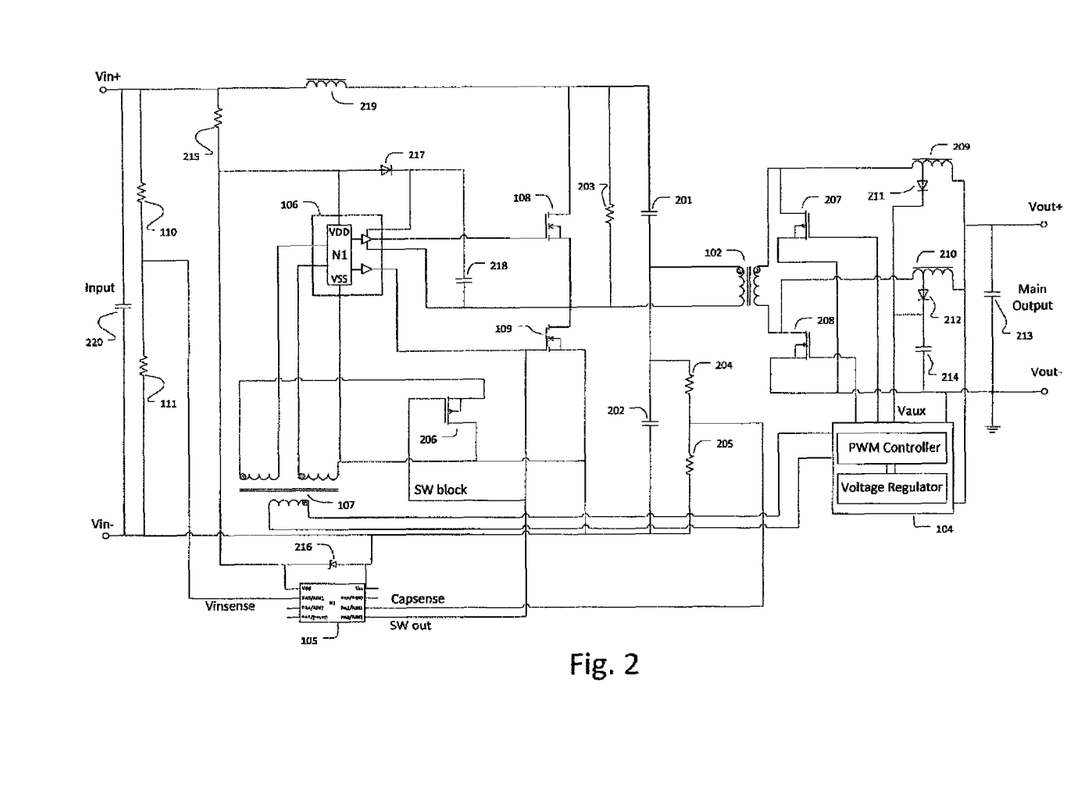
FIG. 2 is a detailed circuit diagram of an SMPS according to the first embodiment of the invention.

In FIG. 2, the energy storage unit 101 is provided by a series connection of two capacitors 201 and 202 that form a capacitive voltage divider, while the first and second switches 108 and 109 are provided by first and second FET transistors 108 and 109.

The capacitors 201 and 202 are provided between the input terminals of the SMPS. The centre point of the capacitive voltage divider is also connected to a terminal of the primary side coil of the transformer 102.

In alternative implementations, a single capacitor may be used or more than two capacitors may be used and a position within the capacitor arrangement other than the centre point may be connected to the primary side coil of the transformer.

The other terminal of the primary side coil of the transformer 102 is connected to a position within the series connection of FET transistors 108 and 109.

A series connection of resistors 203, 204, 205 and the primary coil of the transformer 102 is provided between the input terminals of the SMPS.

The resistors 204 and 205 form a voltage divider and a position within the voltage divider is connected to an input, labelled Capsense, of the control module 105.

The voltage at the Capsense input is dependent upon the voltage at the centre point of the capacitive voltage divider provided by the capacitors 201 and 202. Since the energy stored by the capacitors 201 and 202 would be dependent upon the centre point voltage of the capacitive voltage divider, the control module 105 is able to determine the stored energy from the Capsense input.

Resistors 110 and 111 are also provided in series between the input terminals and form a voltage divider. A position within the voltage divider formed by resistors 110 and ill is connected to an input, labelled Vinsense, of the control module 105.

The Vinsense input allows the control module 105 to determine the voltage at the input of the SMPS.

The resistor 215 and Zener diode 216 provide a primary side power supply to the control module 105.

The driver 106 for the transistors 108 and 109 comprises the integrated circuit, labelled N1, diode 217 and capacitor 218.

Suitable driving arrangements of the transistors 108 and 109 include sharing a driver with the main power train.

There is a shared connection between the driver 106, the gate of the transistor 109 and a port, labelled SW out, of the control module 105.

Transistor 206 is connected to the coupling device 107, the driver circuit 106, the gate of the transistor 109 and the SW out port of the control module 105.

The transistor 206 is configured to switch off the transistor 108 if the transistor 109 is switched on.

Such an event could occur if the control module 105 operates and the output voltage controller 104 also operates at the same time. The transistor 206 therefore ensures that there is no short circuit between the input terminals of the SMPS.

The secondary side of the SMPS includes transistors 207 and 208 which act as switching elements.

The inductors 209 and 210, diodes 211 and 212, and capacitors 213 and 214 provide a filtering arrangement with outputs to the main output of the SMPS as well as the output voltage controller 104.

The filtering arrangement is configured so that the capacitor 213 providing the voltage at the main output of the SMPS charges at a slower rate than the capacitor 214 that provides the voltage of the output voltage controller 104.

The output voltage controller 104 therefore receives sufficient energy to switch on and operate before a significant amount of energy has been transferred to the main output of the SMPS.

Before a switch on operation occurs, the present embodiment is arranged to detect approximately half of the input voltage at the centre point of the capacitive voltage divider provided by capacitors 201 and 202. Typically, the centre voltage will be within ±5% of half of the input voltage.

The arrangement of resistors 203, 204 and 205 provide a so-called bleeder arrangement that is configured to return the voltage at the centre point of the capacitive voltage divider to approximately half of the input voltage if it is pulled away, as occurs during the process of releasing stored energy from the capacitors.

By ensuring that the resistors have a high resistance, the bleeder resistor arrangement has a relatively high time constant, in the region of tens of milliseconds to a second.

The operation of the SMPS shown in FIG. 2 during a start-up operation, is described below.

When the control module 105 detects that the input voltage is above an under voltage lock out protection level it will begin a start-up operation.

The centre voltage of the capacitive voltage divider is detected by the control module 105 and used to determine the amount of energy stored in the capacitors 201 and 202.

When the control module 105 detects that sufficient energy is stored in the capacitors 201 and 202 for a start-up attempt to be made, it will switch on the transistor 109 and thereby discharge the capacitors 201 and 202 through the primary side of the transformer 102.

The control module 105 is able to detect the energy released from the capacitors, and transferred from the primary side to the secondary side, by monitoring the Capsense input.

When the voltage at the Capsense input has dropped by a predetermined amount, or the transistor 109 has been switched on for a predetermined maximum duration of time (which is monitored by the control module 105), the control module 105 switches off the transistor 109.

When transistor 109 is switched off, the discharge of the capacitors and transfer of energy from the primary to secondary sides stops.

Advantageously, the control module 105 controls a start-up operation using measured voltages, and current measurements are not required.

Furthermore, accurate voltage sensing is not essential since the protection against the worst case scenario is provided by the maximum amount of transferred energy being limited to that stored in the capacitors 201 and 202.

If the output voltage controller 104 is operating, the average voltage level at the port SW out will be significant and higher than zero. The control module 105 is therefore able to determine if the output voltage controller 104 has switched on and is operating by monitoring the port SW out.

In the event that the control module 105 determines that the output voltage controller 104 has switched on and is operating, then the control module 105 determines that no further start-up operations are required and the control of the switching is continued by the output voltage controller 104.

In the event that the control module 105 determines that the output voltage controller 104 has not switched on in response to the transferred energy, a further attempt at switching on the output voltage controller 104 is required.

The capacitors will recharge through the arrangement of bleeder resistors.

The current flowing through the arrangement of bleeder resistors 203, 204 and 205 will self-reset the magnetic field in the transformer core.

The current through the resistors will magnetise the core in the opposite direction to what it will have been magnetised in when the transistor 109 was turned on.

Although the primary side coil of the transformer 102 is used in one direction only, the bleeder resistor arrangement is configured to pull the magnetic energy in the opposite direction. The transformer can therefore use both the positive and a bit of the negative flux swing and transfer more energy than would be possible with just one-phase.

When the SMPS is operating, the leakage current resulting form the start-up operation will be corrected for in the main power train.

The arrangement of bleeder resistors therefore allows the capacitors to automatically recharge and the SMPS to return to a state whereby a further start-up attempt is possible.

When the control module detects that sufficient energy is stored by the capacitors 201 and 202 for a further start-up attempt to be made, it will repeat the above operations until the output voltage controller 104 has switched on and is operating or the start of the SMPS is otherwise aborted.

Due to the high time constant of the bleeder resistor arrangement, a typical reset time would be much longer than the on time of the transistor 109.

The above described procedure of sending pulses of energy from primary to secondary sides operates with hysteresis.

A method of switching on the output voltage controller 104 of a switched mode power supply according to an embodiment of the invention is described below with reference to FIG. 3.

Figure 3:
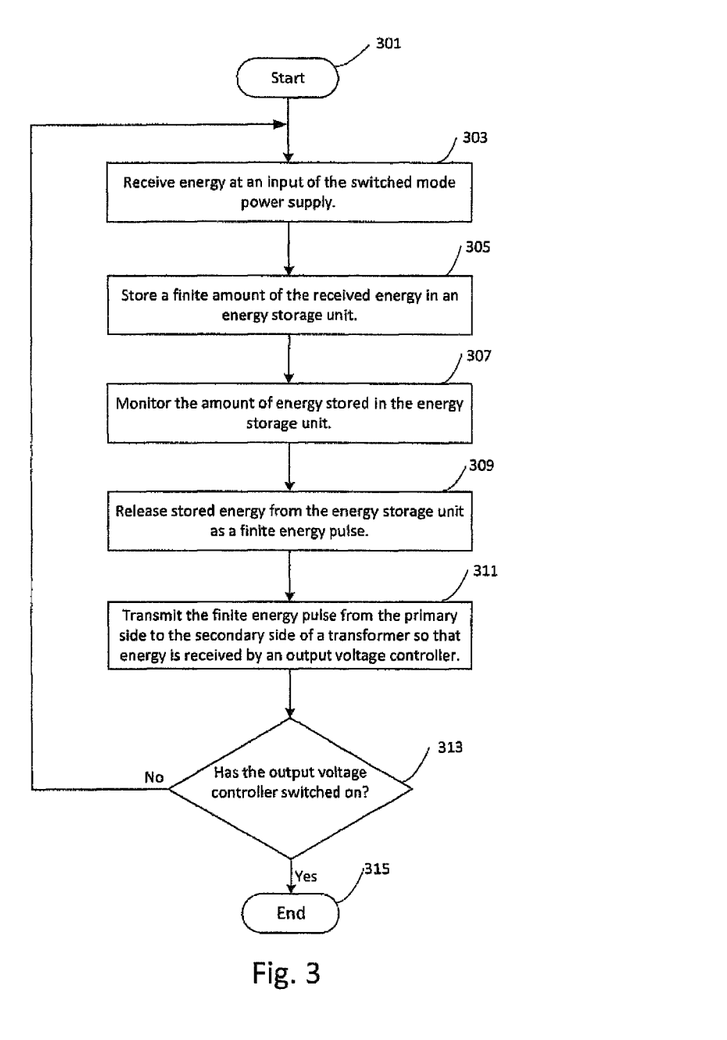
FIG. 3 is a flowchart showing a method according to an embodiment of the invention.

Referring to FIG. 3, in step 302, energy is received at the input of the switched mode power supply.

In step 305, a finite amount of the received energy is stored in the energy storage unit 101.

In step 307, the control module 105 monitors the amount of energy stored in the energy storage unit 101.

In step 309, stored energy is released from the energy storage unit 101 as a finite energy pulse.

In step 311, the finite energy pulse is transmitted from the primary side to the secondary side of the transformer 102 so that energy is received by the output voltage controller 104 to switch on.

In step 313, the control module 105 determines if the output voltage controller 104 has switched on by monitoring the SW out input to determine if control signals are being received from the secondary side.

If the control module 105 determines that the output voltage controller 104 has not switched on, the process returns to step 303 and repeats.

Alternatively, if the control module 105 determines that the output voltage controller 104 has switched on, the process then proceeds to step 315 where it ends.

Typical values for the DC/DC converter shown in FIG. 2 supplied with 48V and around 100 W are:

Capacitor 201=4.70 µF
Capacitor 202=4.7 µF
Resistor 203=100 kΩ
Resistor 204=91 kΩ
Resistor 205=9 kΩ

Transistor 102=5 primary turns, 30 mm² core area

Maximum on time of transistor 109: 6 μs

Recharge time for capacitors 201 and 202: >1 s

Energy stored in capacitors 201 and 202: 2.7 mJ

Lower values for resistors 203, 204 and 205 would result in a shorter recharge time and a larger power dissipation in the bleeder resistor arrangement.

With the above example combonent values, only 11 mW dissipated in the bleeder resistor arrangement.

The embodiment of SMPS described above provides at least the following advantages:
- there is inherent short circuit protection;
- the control module 105 is able to measure the amount of transferred energy;
- a simple one pulse start is performed;
- it is possible for further start-up operations to be made if required;
- a simple and inexpensive implementation of the switching is possible, using just a low side transistor (i.e. a transistor with a port connected to ground); and
- the power for the output voltage controller is derived from the main power train. A second transformer, or auxiliary power supply, is not required,

[Modifications and Variations]

Many modifications and variations can be made to the embodiment described above.

Figure 4A:
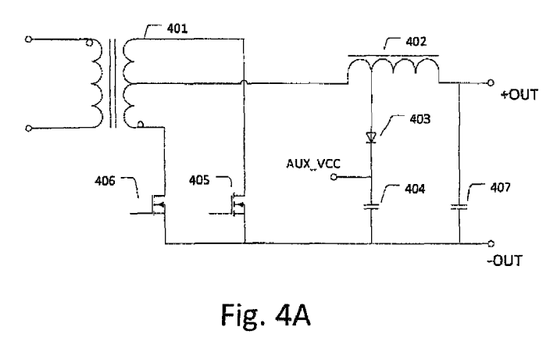
FIGS. 4A and 4B show alternative arrangements of a transformer and power supply circuit for use in embodiments of the invention.
Figure 4B:
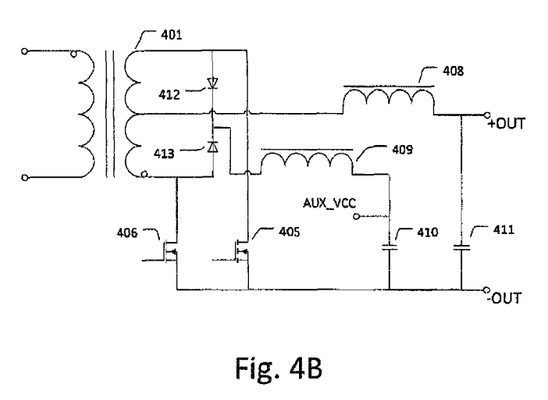

For example, shown in FIGS. 4A and 4B are alternative designs and arrangements of power supply circuit 103 and secondary side of the transformer 102 from that shown in FIG. 2.

The designs of power supply circuit 103 in FIGS. 2, 4A and 4B are all appropriate for supporting small electronic circuits with a low power consumption.

The arrangement of FIG. 4A comprises a main output filter and an output voltage controller filter.

The main output filter provides power at the main output of the SMPS. The output voltage controller filter provides the power to the output voltage controller.

By ensuring that the output voltage controller filter charges up faster than the main output filter, power is supplied to the output voltage controller before significant power appears at the main output of the SMPS.

The main output filter and output voltage controller filter both share part of inductor 402.

This shared inductor arrangement is the similar to that used in the power supply circuit of FIG. 2.

The inductance of the inductor of the main output filter is set by the entire length of inductor 402. However, the inductance of the inductor of the voltage regulator filter is set by just part of the length of the inductor 402. By using a different tap within the inductor 402, the inductance of the output voltage controller filter can be changed as desired.

Since the main output filter and the output voltage controller filter share part of the same inductor, a cost efficient design is realised that requires less components than an arrangement with separate inductors.

However, the setting of the time constants of each filter is more restrictive and so a high transformer voltage may be required before the required voltage is output to the output voltage controller.

The arrangement in FIG. 4B differs from that in FIG. 4A in that the filters do not share part of the same inductor. Inductor 408 and capacitor 411 provide the main output filter of the SMPS. Inductor 409 and capacitor 410 provide the output voltage controller filter.

The separate inductors allow more flexibility in the setting of the time constants of each filter and so it is easier to output a desired voltage to the output voltage controller. However, the power supply circuit in FIG. 4B requires more components.

Referring to FIG. 2, to detect the input at the SW out port of the control module 105, a number of samples may be taken and the average calculated. Alternatively, a filter may be attached to the gate of transistor 109 and read by another input of the control module 105.

With regard to detecting the Capsense input of the control module 105, a control module 105 with good analogue to digital resolution would be able to read a high frequency ripple. Samples of Capsense may be made at random time intervals. Stable DC levels would indicate non-operation whereas levels continuously increasing would indicate that the capacitive voltage divider was charging.

The control module 105 may be implemented by a generic low cost microcontroller unit that may also perform other housekeeping activities when the converter is running.

Alternatively, the control module 105 may be implemented by a number of analogue and/or digital circuits providing the required hysteresis.

In the above described embodiments, the switching is performed by FET transistors. However, BJT transistors or any other suitable switching module could alternatively be used.

In the above described embodiments, capacitors were used as the energy storage unit. However, an SMPS could alternatively be implemented with other types of energy storage unit. For example, a rechargeable battery could be used.

The embodiments described above are of a DC/DC converter. However, the inventive concept could also be implemented in other types of converter.

The foregoing description of embodiments of the invention has been presented for the purpose of illustration and description. It is not intended to be exhaustive or to limit the invention to the precise form disclosed. Alternations, modifications and variations can be made without departing from the spirit and scope of the present invention.

The invention claimed is:

1. A switched mode power supply comprising:
    a transformer having a primary side and a secondary side;
    an input to the switched mode power supply arranged on the primary side;
    a main output of the switched mode power supply arranged on the secondary side;
    an output voltage controller arranged on the secondary side and operable to control an output voltage at the main output of the switched mode power supply;
    a power supply circuit arranged to provide a power supply on the secondary side, wherein the power supply circuit is operable to receive power from the primary side via the transformer and to output power to the main output and also to the output voltage controller, the power supply circuit including a filter arrangement to output power;
    an energy storage unit arranged on the primary side and operable to receive and store a finite amount of energy from the input to the switched mode power supply and to output a finite energy pulse to the primary side of the transformer during a start-up operation; and
    a control module arranged on the primary side and operable to switch on the output voltage controller during the start-up operation by releasing stored energy from the energy storage unit in the finite energy pulse to switch on the output voltage controller, wherein the control module controls a duration of the finite energy pulse to limit an amount of stored energy transferred across the transformer to the power supply circuit to switch on the output voltage controller and wherein the filter arrangement of the power supply circuit responds faster in providing the power to the output voltage controller than providing the power to the main output to ensure that the output voltage controller is functional prior to providing the output voltage at the main output.

2. The switched mode power supply according to claim 1, wherein the control module is operable to monitor an amount of energy stored in the energy storage unit and to control a start of a release of stored energy from the energy storage unit as the finite energy pulse in dependence upon the amount of energy stored in the energy storage unit.

3. The switched mode power supply according to claim 2, wherein the control module is operable to monitor an amount of energy released from the energy storage unit and to stop the release of energy from the energy storage unit as a finite energy pulse in dependence upon the amount of energy released from the energy storage unit.

4. The switched mode power supply according to claim 3, further comprising a switching module controllable by the control module to start and stop the release of energy from the energy storage unit for transfer from the primary side to the secondary side.

5. The switched mode power supply according to claim 4, wherein the switching module is controllable to provide a switching of a main power train of the switched mode power supply when the switched mode power supply is operating.

6. The switched mode power supply according to claim 5, wherein:
the switching module comprises a first switch coupled to a first terminal of the input to the switched mode power supply, and a second switch coupled to a second terminal of the input to the switched mode power supply;
the first switch and second switch are arranged in series between terminals of the input to the switched mode power supply; and
a position within a series connection of the first switch and second switch is coupled to a second terminal of a primary side coil of the transformer;
wherein:
the second terminal of the input to the switched mode power supply is a ground reference; and
the control module is operable to:
start the release of energy from the energy storage unit by switching on the second switch; and
stop the release of energy from the energy storage unit by switching off the second switch.

7. The switched mode power supply according to claim 6, wherein the energy storage unit comprises at least one capacitor.

8. The switched mode power supply according to claim 7, wherein:
the energy storage unit comprises a series connection of at least two capacitors;
the series connection of at least two capacitors is arranged between terminals of the input to the switched mode power supply; and
a first terminal of the primary side coil of the transformer is connected to a position within the series connection of at least two capacitors.

9. The switched mode power supply according to claim 8, further comprising:
a series connection of bleeder resistors arranged in series with the primary side coil of the transformer;

wherein:
the series connection of bleeder resistors and the primary side coil of the transformer are arranged between terminals of the input to the switched mode power supply; and
the control module is operable to detect a voltage level at a position within the series connection of bleeder resistors and primary side coil of the transformer to recharge the energy storage unit to repeat the start-up operation to switch on the output voltage controller when a first attempt to switch on the output voltage controller fails.

10. The switched mode power supply according to claim 9, wherein the control module is operable to stop the release of energy from the energy storage unit by switching off the second switch when the detected voltage level reaches a predetermined threshold level or after a predetermined time from when the second switch was switched on.

11. The switched mode power supply according to claim 10, further comprising:
a series connection of at least first and second input resistors arranged between terminals of the input to the switched mode power supply;
wherein:
the control module is operable to detect a voltage level at a position within the series connection of at least first and second input resistors to determine an input voltage level to the switched mode power supply; and
the control module is operable to determine when the start-up operation is to be performed in dependence upon the determined input voltage level and the detected voltage level at the position within said series connection of bleeder resistors and primary side coil of the transformer.

12. The switched mode power supply according to claim 11, further comprising a third switch operable to switch the first switch off when both the first switch and the second switch are on.

13. The switched mode power supply according to claim 12, further comprising a coupling device for transmitting control signals for the switching module from the secondary side to the primary side;
and wherein the output voltage controller comprises a voltage regulator and a pulse width modulator (PWM) controller for controlling the switching module on the primary side.

14. The switched mode power supply according to claim 13, wherein the control module is operable to monitor a drive signal of the switching module to determine when the output voltage controller is operating.

15. A method of operating a switched mode power supply having a transformer with a primary side and a secondary side, an input to the switched mode power supply arranged on the primary side, an energy storage unit arranged on the primary side, a main output of the switched mode power supply arranged on the secondary side, and an output voltage controller arranged on the secondary side to receive power from the primary side and to control an output voltage at the main output of the switched mode power supply, the method being performed to switch on the output voltage controller during a start-up operation comprising:
receiving energy at the input of the switched mode power supply;
storing a finite amount of the received energy in the energy storage unit;

releasing stored energy from the energy storage unit as a finite energy pulse of only one pulse duration that is transferred from the primary side to the secondary side; and transferring the finite energy pulse from the primary side to the secondary side of the transformer so that the finite energy pulse is received by the output voltage controller during the start-up operation to switch on the output voltage controller, wherein the finite energy pulse has a limited duration to limit an amount of stored energy transferred across the transformer to switch on the output voltage controller and wherein a filter arrangement responds faster in providing the stored energy to the output voltage controller than providing the energy to the main output to ensure that the output voltage controller is functional prior to providing the output voltage at the main output.

16. The method of operating a switched mode power supply according to claim 15, further comprising:

monitoring an amount of energy stored in the energy storage unit; and controlling a start of a release of stored energy from the energy storage unit as the finite energy pulse in dependence upon the monitored amount of energy stored in the energy storage unit.

17. The method of operating a switched mode power supply according to claim 16, further comprising:

monitoring an amount of energy released from the energy storage unit; and stopping the release of energy from the energy storage unit in dependence upon the amount of energy released from the energy storage unit.

18. The method of operating a switched mode power supply according to claim 17, further comprising:

stopping the release of energy from the energy storage unit after a predetermined time from when the release of energy from the energy storage unit was started.

* * * * *